March 27, 1956     W. H. NEWELL     2,739,447
MOTION-REPRODUCING DEVICE
Filed Jan. 13, 1940     3 Sheets-Sheet 2
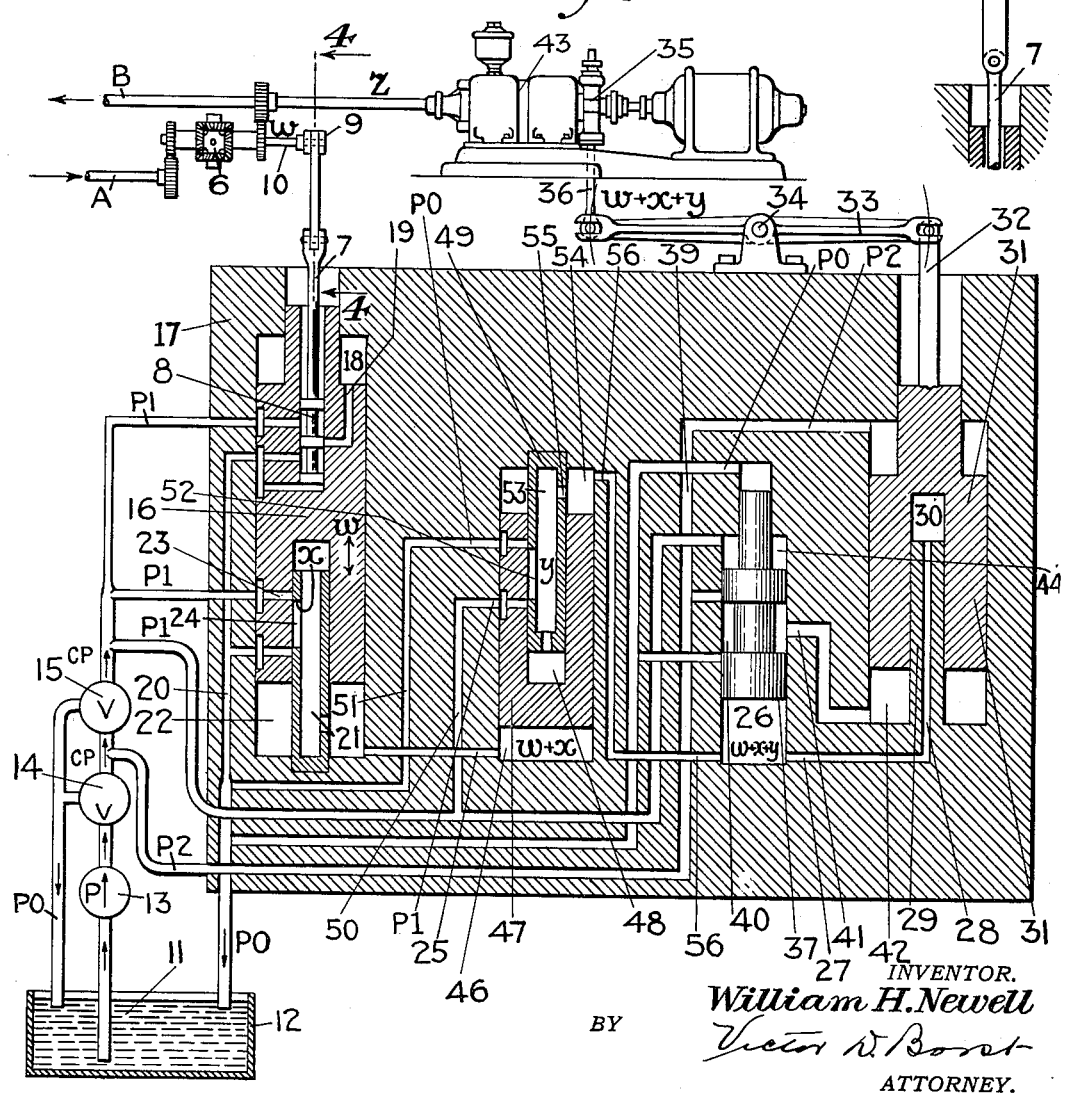
INVENTOR.
William H. Newell
BY Victor D. Borst
ATTORNEY.

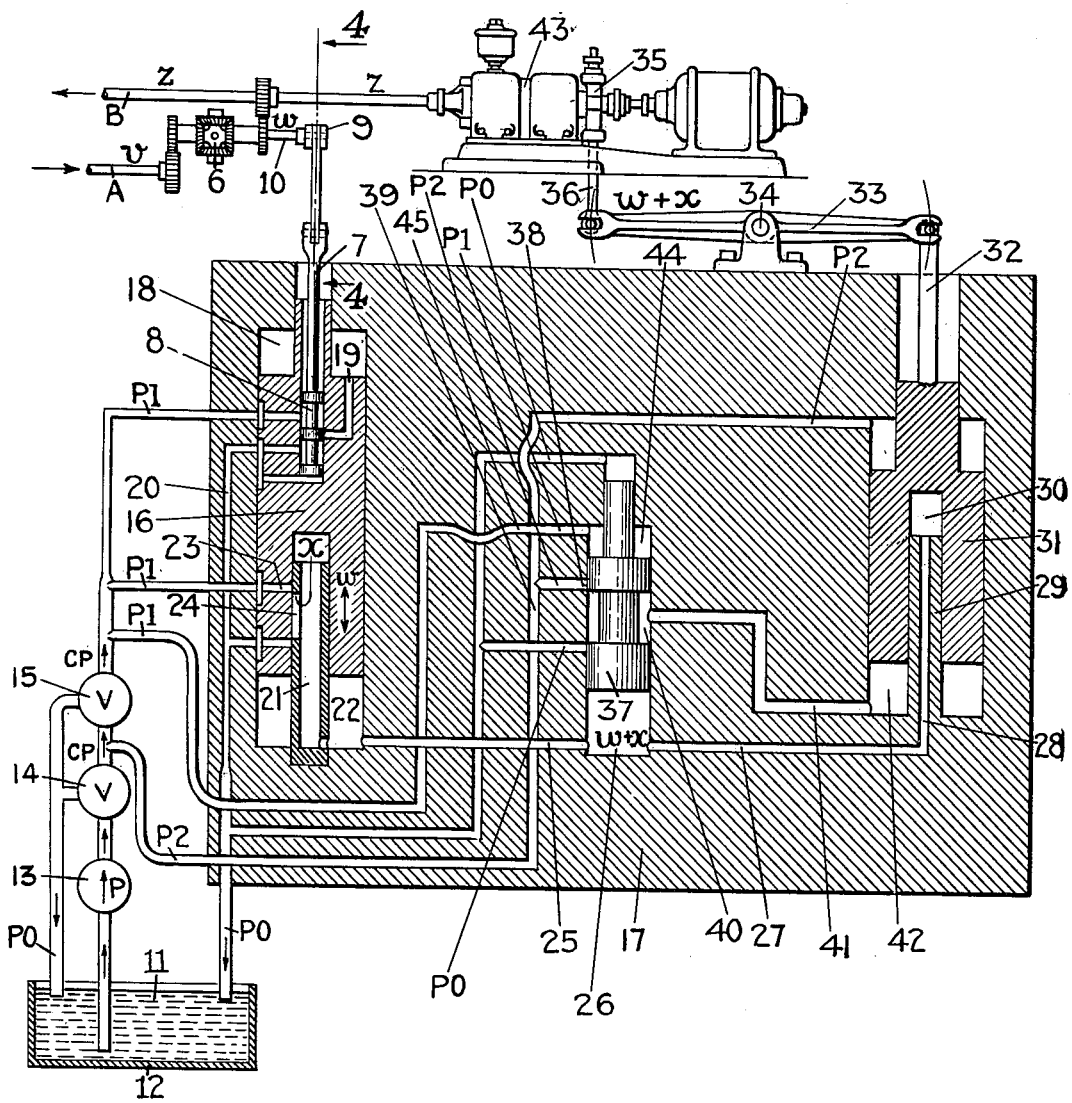

March 27, 1956  W. H. NEWELL  2,739,447
MOTION-REPRODUCING DEVICE
Filed Jan. 13, 1940  3 Sheets-Sheet 3

INVENTOR.
William H. Newell
BY
ATTORNEY.

United States Patent Office 2,739,447
Patented Mar. 27, 1956

2,739,447

MOTION-REPRODUCING DEVICE

William H. Newell, New York, N. Y., assignor to Ford Instrument Company, Inc., Long Island City, N. Y., a corporation of New York Application January 13, 1940, Serial No. 313,678

15 Claims. (Cl. 60—53)

The invention herein disclosed relates to a motion-reproducing device in which the movement of one member is reproduced by another member, the latter member being actuated by a prime mover.

Motion-reproducing mechanisms of this type have various applications and they are particularly useful where it is desired to effect the movement of a member, a driven member, in accordance with the motion of another member, a motion-receiving member, but which requires more power than is available at the motion-receiving member.

The principal object of the invention is to provide a motion-reproducing unit in which the error between the motion-receiving member and the driven member is in proportion to variations in the acceleration of the driven member.

Other objects will be apparent from the specification and the drawings.

Various types of motion-reproducing devices have heretofore been devised, but in general such devices operate by the direct control of a prime mover that drives the driven member in accordance with a reproduction of the motion of the motion-receiving member. In such motion-reproducing units the full torque of the prime mover is not available for driving the driven member because the speed of the prime mover is varied in accordance with variations in the speed of the motion-receiving member and the controls place a reaction torque upon the prime mover.

Motion-reproducing devices have also heretofore been produced wherein the error between the motion-receiving member and the driven member is in proportion to the velocity of the driven member. Such a mechanism is composed of a differential inserted between the motion-receiving member and the driven member, the output of this differential being connected to the control element of a variable speed mechanism, the output of which is the driven member.

Another type of motion-reproducing device has been devised whereby the error between the motion-receiving and the driven member is in proportion to the acceleration of the driven member. An embodiment of that improvement has been made the subject of an application for Letters Patent Serial No. 117,155 filed December 22, 1936, in which was disclosed the use of a second differential and a second variable speed mechanism. A differential whose output is the difference between the motion-receiving member and the driven member controls a variable speed mechanism. A second differential is connected between the output of the first differential and the output of the first variable speed mechanism and the difference between these motions controls the second variable speed mechanism. The output of this second differential is connected to the driven member.

In this present invention there is provided a motion-reproducing unit in which there is utilized a third differential and a third variable speed mechanism whereby the error between the motion-receiving and driven member is in proportion to variations in the acceleration of the driven member.

In the drawings:

Fig. 1 is a diagrammatic illustration of a motion-reproducing device including a valve controlled by a differential between a motion-receiving member and a driven member and associated with two other valves one of which controls a variable speed mechanism;

Fig. 2 is a diagrammatic illustration of a combination of three differentials and three variable speed mechanisms;

Fig. 3 is a diagrammatic illustration of a hydraulically operated device corresponding to that illustrated in Fig. 2;

Fig. 4 is a cross-section of the device taken on line 4—4 in Figs. 1 and 3;

Figure 5:
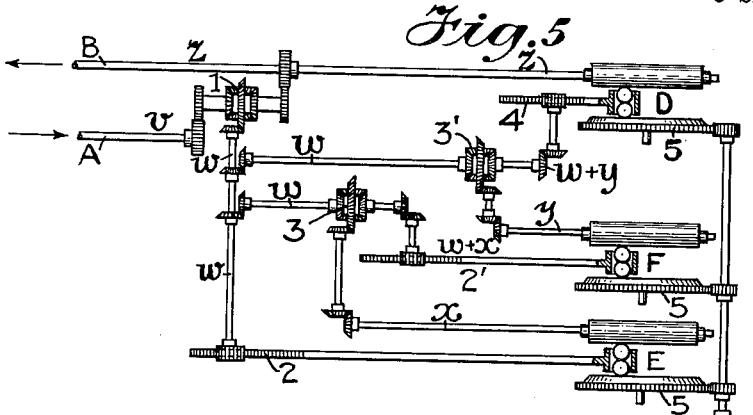
Fig. 5 illustrates a modified form of the device shown in Fig. 2.

In Fig. 1, motion-receiving member A, the movement of which is represented by $v$, and the driven member B, the movement of which is represented by $z$, are connected to differential 6, the output of which, represented by $w$, is transmitted to the stem 7 of pilot valve 8 by a bell crank lever 9 turning about shaft 10 (see Fig. 4).

A quantity of oil 11, kept in reservoir 12, is supplied to the valve arrangement as a whole by a constant speed pump 13 through two reducing valves 14 and 15 respectively. In practice, the lower pressure, indicated as P1, is about half the higher pressure, indicated as P2. Pipes and passageways for the drainage of various ports of the valve mechanism are indicated as P0.

The passages and valve ports or slots in the piston valves are of such design that the amount of oil passing through varies directly as the motion of the valve. In operation all of the passages and recesses are full of oil.

The operation of the mechanism will be first followed through for a downward movement of valve stem 7.

Piston amplifier valve 16 is slidable in a recess in valve block 17. Its position is determined by the movement of pilot valve stem 7 which permits, for example, by its downward movement, oil under pressure P1 to pass around valve 8 and enter recess 18 by passage 19. This forces piston valve 16 downward. In practice, the follow-up action of this amplifier valve is so rapid that the actual movement of the piston valve 16 is equal to that of the pilot valve stem 7 and is therefore equal to the error between A and B, which is represented as $w$.

Upon the descent of piston valve 16, oil is permitted to enter recesses 21 and 22 through the passage 23 and its associated valve port 24. The motion of piston valve 16 also displaces the oil already in recesses 21 and 22 so that the volume of oil flowing through passage 25 equals the amount of oil displaced by the movement of piston 16 and the amount of oil entering through valve port 24, represented by $x$. The actual volume of oil moved through passage 25 is therefore proportional to $w+x$.

The volume of oil represented by $w$ plus $x$ enters recess 26 which is connected by passage 27 to recess 28, which is in the form of a cylinder 29 open at the top where it merges into recess 30 in main piston 31. The upper end of the piston 31 is connected by a rod 32 to a lever 33 pivoted at 34, the other end of which lever 33 is connected to the control element 36 of tilt box 35 of a hydraulic variable speed mechanism 43.

As the power required to move the control element of tilt box 35 is quite large, relay valve 37 is provided which operates the piston 31 as follows: Relay valve 37 operates in recess 26 and as the piston valve 16 moves downward oil is caused to flow through the passage 25 into the recess 26, forcing the valve 37 upward and uncovering the port 38. Oil under pressure P2 thereupon enters recess 42 through recess 40 and passage 41 and raises the piston 31. As soon as piston 31 has moved up in proportion to the volume of oil displaced from recess 22, piston 37, operating under pressure P1 supplied through passage 45, moves downward and covers up port 38. It is thus seen that the motion of the main piston 31 is proportional to the quantity of oil passing through passage 27 or is proportional to $w$ plus $x$.

As the motion of the main piston 31 moves the tilting box 35 of the hydraulic variable speed gear 43 and neglecting the sine function inherent in the design of this type of speed gear, the motion of the control element 36 is proportional to the velocity of the output, represented by $z$, or is equal to $$k\frac{dz}{dt}$$

where $k$ is a proportionality constant. Since the motion of the piston 31 is proportion to $w$ plus $x$, it follows that $$w+x=k\frac{dz}{dt} \quad (1)$$

The shape of the port 24 is rectangular and the pressure drop across it is a constant since the pressure in passage 25 is maintained at one-half P1 by the pressure P1 acting on one-half of the top of the piston valve 37 in recess 44 through passage 45. As the result of this, the volume of flow through the port 24 is approximately proportional to the opening of the port. The volume of flow through port 24 is $$\frac{dx}{dt}$$

and the opening is proportional to the motion of the valve stem 7 or $w$ so that $$w=k_1\frac{dx}{dt} \quad (2)$$

where $k_1$ is a proportionality constant, whose value is dependent upon the size of the slots or ports and the pressure drop. Differentiating equation (1) gives $$\frac{dw}{dt}+\frac{dx}{dt}=k\frac{d^2z}{dt^2} \quad (3)$$

substituting (2) in (3) gives $$k_1\frac{dw}{dt}+w=kk_1\frac{d^2z}{dt^2} \quad (4)$$

Since $z=v-w$, it follows that $$kk_1\frac{d^2w}{dt^2}+k_1\frac{dw}{dt}+w=kk_1\frac{d^2v}{dt^2} \quad (5)$$

This equation defines the general relation between the error and the input signal.

The solution of such an equation is of the type:

$$w=Ke^{\frac{-k_1+\sqrt{k_1^2-4kk_1}}{2kk_1}t}+K_1e^{\frac{-k_1-\sqrt{k_1^2-4kk_1}}{2kk_1}t}+U \quad (6)$$

where K and $K_1$ are constants depending on the initial or starting conditions of position and velocity of the error, as for example, when the device is put in operation, the driven member B may be 10 degrees from the motion-receiving member A or the tilt box may be at an angle of 10 degrees to the vertical. U is the particular integral depending on the character of the input signal, as for example, a sine wave signal. The first two elements of the equation represent transient relations and the last element represents the final form or when the device is in equilibrium.

If $4kk_1$ is greater than $k_1^2$ the exponents in the equation become imaginary and the resulting motion will be oscillatory with a decreasing amplitude. If $4kk_1$ equals $k_1^2$ the motion becomes critically damped and if less than $k_1^2$ it becomes over damped. The ideal condition is to have the follow-up critically damped in which case $$4kk_1=k_1^2 \quad (7)$$

or $$4k=k_1 \quad (8)$$

and since two arbitrary constants are required the equation of motion becomes:

$$w=(K+K_1t)e^{\frac{-t}{2k}}+U \quad (9)$$

where $2k$ represents the time to decrease the original error to $$\frac{1}{2.72}$$

times its value or is a measure of the synchronizing time. The original differential equation for the critically damped case would be $$4k^2\frac{d^2w}{dt^2}+4k\frac{dw}{dt}+w=\frac{4k^2}{dt^2}\frac{d^2v}{dt^2} \quad (10)$$

and if the signal were a sine motion represented by $v=C\sin Wt$, then the error would also be a sine motion with an amplitude $$w\max=\frac{4Ck^2W^2}{1+4k^2W^2} \quad (11)$$

and leading the original signal by a phase angle $$\tan^{-1}\left(\frac{1-4k^2W^2}{4kW}\right)+90°$$

In practice it has been found that the constant $k$ for speed gears must be kept approximately at ⅛° per deg. per sec. or, in the units of time, ⅛ sec. At any lower figure the Equation 1 given above is not satisfactorily maintained.

If this figure for $k$ is used in the critically damped case it may be found that the error is excessive. This is corrected in some cases by making the follow-up with $k_1$ slightly smaller than $4k$ in which case it has a tendency to oscillate in synchronizing. The decrease in the amplitude of oscillation, however, is so fast that not more than about two or three oscillations are noted.

In applying the types of mechanism disclosed in Fig. 1 to certain types of follow-up systems, it has been found that the errors for the critically damped cases are so large due to the effect of fluctuating accelerations that their correction by the control of the constants in this type of mechanism made the follow-up too unstable and there has been added an additional differential and variable speed mechanism as shown in Fig. 2 and, correspondingly, an additional valve mechanism as shown in Fig. 3.

In Fig. 2, A is a motion-receiving member whose motion is represented as $v$. B is the driven member whose motion is represented by $z$. These two members are connected to differential 1 the output of which, represented by $w$, is connected to the control member 2 of variable speed mechanism E. The output of differential 1 and the output of variable speed mechanism E, represented by $x$, are connected to differential 3, the output of which $(w+x)$ is connected to the control element 2' of variable speed mechanism F the output of which is represented by $y$. The output of differential 3 and the output of variable speed mechanism F are connected to the differentian 3' the output of which $(w+x+y)$ is connected to the control element 4 of variable speed mechanism D. The output of variable speed mechanism D is connected to the driven member B. Prime mover M drives the power members 5, 5, 5 of variable speed mechanisms E, F and D.

Fig. 3 shows the hydraulic equivalent of the arrrangement shown in Fig. 2.

It is well known that a liquid flowing at varying volumetric rates may be integrated by directing the liquid into a calibrated container and observing the increase in volume of the liquid in the container during the period of time over which the instantaneous rates of flow are integrated. For this reason valve 16, port 24, recess 22, and associated passageways and recesses may be considered equivalent to the mechanical integrator E and the differential 3. Valve 16 is moved in the same proportion as the control element 2 of integrator or variable speed device E; the volumetric flow of oil through port 24 is in the same proportion as the movement of the output of integrator E and when to this volume is added the volume of oil moved by the downward movement of valve 16 in recess 22, the total volume of oil moving in passage 25 is proportional to the output of differential 3.

Likewise piston valve 47 and associated ports and recesses are equivalent to the integrator F and differential 3'.

The arrangement shown in Fig. 2 is similar to that shown in Fig. 1 except as follows:

Passage 25 is led to recess 46 in which regulator piston valve 47 operates in block 17. In piston valve 47 is a recess 48 in which is located an open ended cylinder 49 secured at its upper closed end in block 17. Oil under pressure P1 and drainage of oil are accessible through passages 50 and 51 respectively. The motion of piston valve 47 along port 52 determines the entrance or drainage of oil from recess 48 and its associated recess 53. Recess 53 opens into recess 54 through port 55. Recess 54 is connected to recess 26 by passage 56.

This regulator valve 47 introduces an additional flow of oil $y$, the rate of which is proportional to $w$ plus $x$. The flow of oil in pipe 56 is therefore proportional to $w$ plus $x$ plus $y$. The operation of main piston 31 is the same as previously described, and the effect on the control member of tilting box 35 of the hydraulic speed gear 43 is proportional to $w+x+y$. Since $z$ is the output of speed gear 43, $$w+x+y=k\frac{dz}{dt} \quad (12)$$

Equation 2 given above for the operation of the amplifier valve still holds, so that $$\frac{dx}{dt}=\frac{w}{k_1} \quad (13)$$

A similar equation describes the flow ($y$) since the port 52 of the regulator valve is rectangular and the pressure drop a constant and $$w+x=k_2\frac{dy}{dt} \quad (14)$$

Differentiating Equation 12 gives $$\frac{dw}{dt}+\frac{dx}{dt}+\frac{dy}{dt}=k\frac{d^2z}{dt^2} \quad (15)$$

Differentiating Equation 14 gives $$\frac{dw}{dt}+\frac{dx}{dt}=k_2\frac{d^2y}{dt^2} \quad (16)$$

Substituting Equation 13 in 16

$$\frac{dw}{dt}+\frac{w}{k_1}=k_2\frac{d^2y}{dt^2} \quad (17)$$

Substituting 13 in 15 and differentiating gives $$\frac{d^2w}{dt^2}+\frac{1}{k_1}\cdot\frac{dw}{dt}+\frac{d^2y}{dt^2}=k\frac{d^3z}{dt^3} \quad (18)$$

Substituting 17 in 18

$$k_1k_2\frac{d^2w}{dt^2}+(k_1+k_2)\frac{dw}{dt}+w=kk_1k_2\frac{d^3z}{dt^3} \quad (19)$$

Since $z=v-w$, it follows that $$kk_1k_2\frac{d^3w}{dt^3}+k_1k_2\frac{d^2w}{dt^2}+(k_1+k_2)\frac{dw}{dt}+w=kk_1k_2\frac{d^3v}{dt^3} \quad (20)$$

This is the general equation for the follow-up and completely describes its motion. The solution of such an equation is of the type $$w=Ge^{m_1t}+He^{m_2t}+Ie^{m_3t}+U \quad (21)$$

where $G$, $H$ and $I$ are constants depending on the initial conditions of position, velocity and acceleration of the error, $U$ is the particular integral, and $m_1$, $m_2$, and $m_3$ are the roots of the auxiliary equation.

In order for the follow-up to be stable it is sufficient that $m_1$, $m_2$, and $m_3$ all be negative and not equal to zero. For critical damping the roots should all be equal. From the type of the equation it is possible to show that the roots cannot all be equal due to the presence of the term $(k_1+k_2)$.

Figure 6:
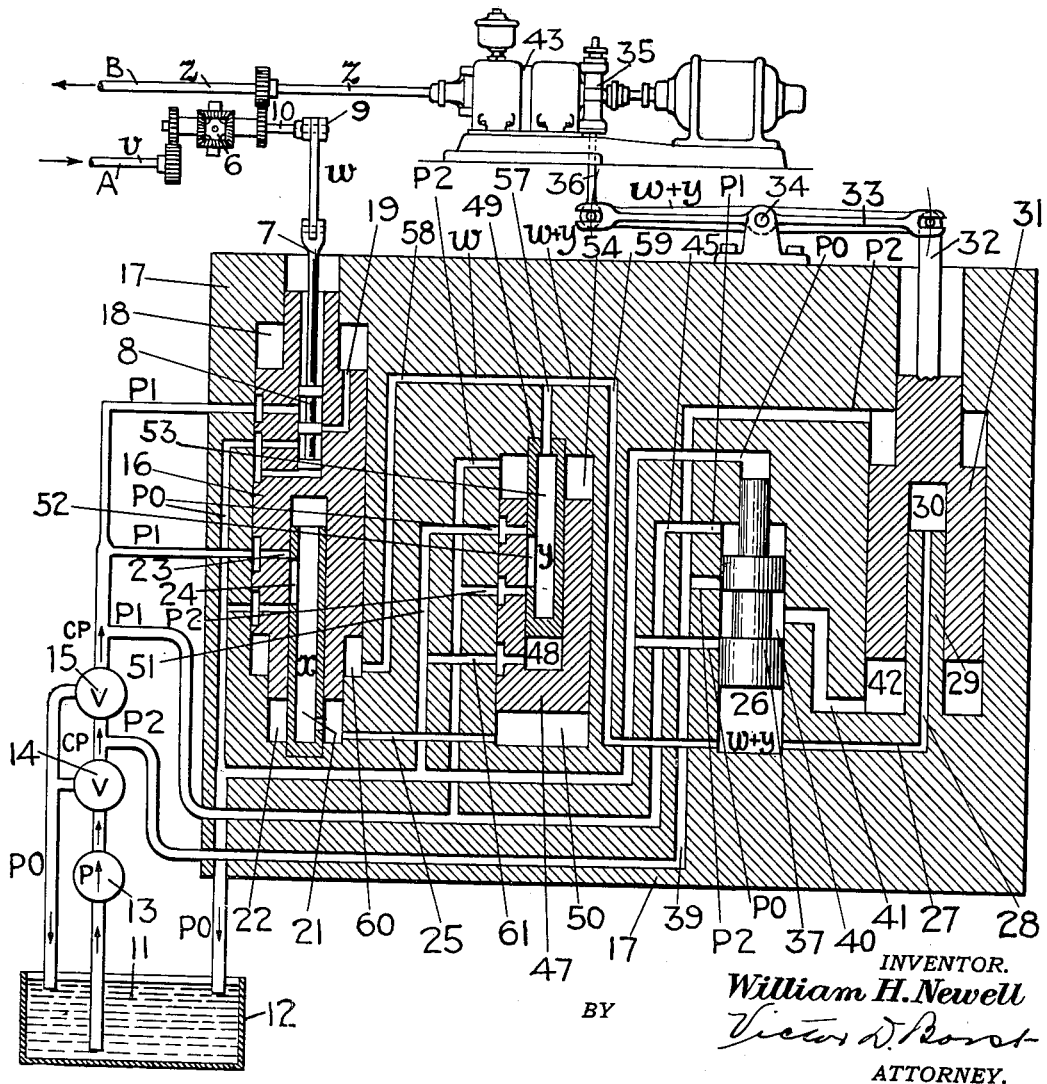
Fig. 6 illustrates a modified form of the device shown in Fig. 3.

In order to eliminate this, there is provided an additional connection between the piston valve 16 and the regulator valve 47, as shown in Fig. 6. In this arrangement, the recess 53 of cylinder 49 is not in communication with recesses 48 and 54 (Figure 3) but recess 53 is connected by passage 57 at the upper end of cylinder 49 to passages 58 and 59, passage 58 being in communication with recess 60, whose volume is controlled by the movement of piston 16. Passage 59 is connected to recess 26, and through passages 27 and 28 to the main piston recess 30, as previously described. Drainage from recess 48 is afforded by passage 61. It will be noted that the movement of piston 47 is for the control of flow of oil $y$ only, and no oil on the top of piston 47 is conducted to recess 26.

To determine that the roots of the auxiliary equation will be negative it is sufficient to show that all the coefficients are positive and that $(k_1+k_2)$ is greater than $k$. This thus becomes the criterion for stability.

When following a sine motion represented by $v=J \sin Wt$, the error would be also a sine motion with an amplitude $$w \max=\frac{kk_1k_2W^3J}{\sqrt{(1-k_1k_2W^2)^2+[(k_1+k_2)W-kk_1k_2W^3]^2}}$$

and leading the original signal by a phase angle $$\tan^{-1}\left(\frac{1-k_1k_2W^2}{[k_1+k_2]W-kk_1k_2W^3}\right)+180°$$

The value of the constant $k$, upon which the other constants are based, is dependent on the size and tightness of the speed gear, the inertia load and other quantities which make it a constant to be determined experimentally with the first equipment of each type. The value of $k_1$ and $k_2$ are dependent on $k$ and the accuracy required. As a result of this it is not possible to give an exact value for these constants until the particular conditions under which the follow-up is to operate are given.

In Fig. 5 is shown a mechanical arrangement using differentials and variable speed devices in a manner equivalent to the hydraulic arrangement shown in Figure 6. A is the motion-receiving member whose motion is represented as $v$. B is the driven member whose motion is represented as $z$. These two members are connected to differential 1 the output of which, represented by $w$, is connected to the control member 2 of variable speed mechanism E. The output of differential 1 and the output of variable speed mechanism E are connected to differential 3 the output of which is connected to the control member 2' of variable speed mechanism F. The output of differential 1 and the output of variable speed mechanism F, represented by $y$, are connected to differential 3' the output of which is connected to the control member 4 of variable speed mechanism D. The output of variable speed mechanism D is connected to the driven member. Prime mover M drives the power members 5, 5, 5 of variable speed mechanisms E, F and D. The equations defining the hydraulic components in Fig. 6 are similar to the equations defining the corresponding components in the mechanical arrangement shown in Fig. 5.

The preceding description has been given for a downward movement of the stem 7 of the pilot valve in piston valve 16. The device operates in a similar manner for an upward movement except that the volumes of oil are moved in the opposite directions and the flow of oil through the rectangular ports 24 and 52 is to the oil supply reservoir 12 through drain passages.

I claim:

1. In a motion reproducing device, a motion-receiving member and a driven member, means for producing a motion equal to the difference in motions of said members, a source of independent power, a second means connected to the output of said first means for controlling the output of said power, means for combining the output of said first means and the output of the controlled power, a second source of independent power, means connected to the said combined outputs for controlling said second power, means for combining the last mentioned combined outputs and the output of said second power, a variable speed mechanism, means for connecting the last mentioned combined outputs to the control member of said variable speed mechanism, the output of which is connected to the driven member.

2. In a motion reproducing device, a motion-receiving member and a driven member, means for producing a motion equal to the difference in motions of said members, a source of independent power, a second means connected to the output of said first means for controlling the output of said power, means for combining the output of said first means and the output of the controlled power, a second source of independent power, means connected to the said combined outputs for controlling said second power, means for combining the output of said second power with the output of the said first means, a variable speed mechanism, and means connecting this last mentioned combined output to the control member of said variable speed mechanism, the output of which is connected to the driven member.

3. A motion reproducing device comprising a motion-receiving member and a driven member, a valve block with recesses and oil passages therein, a piston slidable in one of said recesses, piston valves slidable in other of said recesses and adapted to control valve ports connected with said passages, a source of oil supplied under pressure to said passages, oil exhaust passages in said block connected with said recesses and said valve ports, a differential connected between the motion-receiving member and the driven member, a control valve connected to the output of said differential and mounted in a first piston valve slidable in a first recess in said block, the said first piston valve being adapted to be moved by said oil in accordance with the movement of said control valve and adapted to discharge oil from said first recess into a second recess in said block in direct proportion to the movement of said first piston valve and in proportion to the amount of opening of the valve ports associated with said first piston valve, a second piston valve slidable in said second recess adapted to be moved in direct proportion to the volume of oil discharged into one end of its recess from said first recess and adapted to discharge oil from the other end of the recess against one end of the said piston slidably mounted in a third recess in said block in direct proportion to the movement of the said second piston and in proportion to the amount of opening of the valve ports associated with said second piston valve, a variable speed mechanism, and means connecting said piston with the control element of said variable speed mechanism, the output of which is connected with the driven member.

4. A motion reproducing device comprising a motion-receiving member and a driven member, a valve block with recesses and oil passages therein, a piston slidable in one of said recesses, piston valves slidable in other of said recesses and adapted to control valve ports connected with said passages, a source of oil supplied under a higher and a lower pressure to said passages, oil exhaust passages in said block connected with said recesses and said valve ports, a differential connected between the motion-receiving member and the driven member, a control valve connected to the output of said differential and mounted in a first piston valve slidable in a first recess in said block, the said first piston valve being adapted to be moved by said oil in accordance with the movement of said control valve and adapted to discharge oil from said first recess into a second recess in said block in direct proportion to the movement of said first piston valve and in proportion to the amount of opening of the valve ports associated with said first piston valve controlling the oil of lower pressure, a second piston valve slidable in said second recess adapted to be moved in direct proportion to the volume of oil discharged into one end of its recess from said first recess and adapted to discharge oil from the other end of the recess against one end of the said piston slidably mounted in a third recess in said block and into a fourth recess in said block in which is slidably mounted a third piston valve movable in direct proportion to the movement of the said second piston valve, the piston, and in proportion to the amount of opening of the valve ports associated with the said second piston valve controlling oil of the lower pressure, the said third piston valve being adapted to control by its movement the flow of oil of the higher pressure to the said third recess, a variable speed mechanism having a control element, and means connecting said piston with the control element of said variable speed mechanism, the output of which is connected with the driven member.

5. A motion reproducing device comprising a motion-receiving member and a driven member, a valve block with recesses and oil passages therein, a piston slidable in one of said recesses, piston valves slidable in other of said recesses and adapted to control valve ports connected with said passages, a source of oil supplied under pressure to said passages, oil exhaust passages in said block connected with said recesses and said valve ports, a differential connected between the motion-receiving member and the driven member, a control valve connected to the output of said differential and mounted in a first piston valve slidable in a first recess in said block, the said first piston valve being adapted to be moved by said oil in accordance with the movement of said control valve and adapted to discharge oil from said first recess in direct proportion to the movement of said first piston valve and in proportion to the amount of opening of the valve ports associated with said first piston valve, one portion of said oil from said first recess being discharged into one end of a second recess and the other portion being discharged against an end of the said piston slidably mounted in a third recess in said block, a second piston valve slidable in said second recess adapted to be moved in direct proportion to the volume of oil discharged into the said one end of its recess and adapted to discharge oil from the other end of its recess against the said one end of the said piston slidably mounted in a third recess in said block in direct proportion to the movement of the said second piston and in proportion to the amount of opening of the valve ports associated with said second piston valve, a variable speed mechanism, means connecting said piston with the control element of said variable speed mechanism, the output of which is connected with the driven member.

6. A motion reproducing device comprising a motion-receiving member and a driven member, a valve block with recesses and oil passages therein, a piston slidable in one of said recesses, piston valves slidable in other of said recesses and adapted to control valve ports connected with said passages, a source of oil supplied under a higher and a lower pressure to said passages, oil exhaust passages in said block connected with said recesses and said valve ports, a differential connected between the motion-receiving member and the driven member, a control valve connected to the output of said differential and mounted in a first piston valve slidable in a first recess in said block, the said first piston valve being adapted to be moved by said oil in accordance with the movement of said control valve and adapted to discharge oil from said first recess in direct proportion to the movement of said first piston valve and in proportion to the amount of opening of the valve ports associated with said first piston valve controlling the oil of lower pressure, one portion of said oil from said first recess being discharged into one end of a second recess and the other portion being discharged against an end of the said piston slidably mounted in a third recess in said block, a second piston valve slidable in said second recess adapted to be moved in direct proportion to the volume of oil discharged into the said one end of its recess and adapted to discharge oil from the other end of its recess against the said one end of the said piston slidably mounted in a third recess in said block in direct proportion to the movement of the said second piston and in proportion to the amount of opening of the valve ports associated with said second piston valve, a variable speed mechanism, means connecting said piston with the control element of said variable speed mechanism, the output of which is connected with the driven member.

7. In a motion reproducing device, a motion-receiving member and a driven member, a differential connected between said members, the output of which is connected to a valve stem, a valve block and passages therein, sources of oil supplied under a higher and a lower pressure to said passages in said block, exhaust passages in said block, a piston and piston valves slidably mounted in recesses in said block, valve ports associated with said piston valves and said passages, a control valve connected to said valve stem and adapted to slide in a first piston valve which is slidable in a first recess in said block, valve ports in said control valve associated with the said oil passages and adapted to control and admit the oil under the lower pressure into one end of said first recess in direct proportion to the movement of the said valve stem, valve ports in said first piston valve associated with said passages whereby the oil under the lower pressure is permitted to enter the other end of said recess in proportion to the movement of said valve stem, a discharge passage from said other end of said recess to a second recess in said block in which a second piston valve slides, valve ports associated with said second piston valve and oil passages whereby oil under the lower pressure is permitted to flow into a recess in said piston slidably mounted in a third recess in said block in proportion to the discharge of oil from the said second recess, a third piston valve slidable in a fourth recess in said block and adapted to be moved by the oil discharged from the said second recess, the said third piston valve being adapted to control by its movement the flow of oil from the said higher pressure source to the said third recess, a variable speed mechanism, means connecting said piston with the control element of said variable speed mechanism, the output of which is connected to the driven member.

8. In a motion reproducing device, a motion-receiving member and a driven member, a differential connected between said members, the output of which is connected to the control element of a variable speed mechanism, a second differential connected between the output of the first differential and the output of the variable speed mechanism the output of said second differential being connected to the control element of a second variable speed mechanism, a third differential connected between the output of the second differential and the output of the second variable speed mechanism, the output of said third differential being connected to the control element of a third variable speed mechanism, the output of which third variable speed mechanism is connected to said driven member.

9. In a motion reproducing device, a motion-receiving member and a driven member, a differential connected between said members, the output of which is connected to the control element of a variable speed mechanism, a second differential connected between the output of the first differential and the output of the variable speed mechanism, the output of said second differential being connected to the control element of a second variable speed mechanism, a third differential connected between the output of the first differential and the output of the second variable speed mechanism, the output of said third differential being connected to the control element of a third variable speed mechanism, the output of which third variable speed mechanism is connected to said driven member.

10. In a motion reproducing device, a motion-receiving member and a driven member, a variable speed driving means for the driven member including a speed adjusting element, and controlling means for the variable speed driving means comprising differential means connected to compare the motion of the two members, means for integrating the output of the differential means, means for integrating the output of the integrating means, and means for applying the output of the second integrating means to the speed adjusting element.

11. In a motion reproducing device, a motion-receiving member and a driven member, a variable speed driving means for the driven member including a speed adjusting element, and controlling means for the variable speed driving means comprising differential means connected to compare the motion of the two members, means for integrating the output of the differential means, means for integrating the output of the integrating means, means for combining the output of the differential means with the output of the second integrating means, and means for applying the output of the combining means to the speed adjusting element.

12. In a motion reproducing device, a motion-receiving member and a driven member, a variable speed driving means for the driven member including a speed adjusting element, and controlling means for the variable speed driving means comprising differential means connected to compare the motion of the two members, means for integrating the output of the differential means, means for integrating the output of the integrating means, means for combining the output of the differential means and the outputs of the two integrating means, and means for applying the output of the combining means to the speed adjusting element.

13. In a motion reproducing device, a motion-receiving member and a driven member, a variable speed driving means for the driven member including a speed adjusting element, and controlling means for the variable speed driving means comprising differential means connected to compare the motion of the two members, means for integrating the output of the differential means, means for combining the output of the differential means with the output of the said integrating means, means for integrating the output of the said combining means, and means for applying the output of the last mentioned integrating means to the speed adjusting element.

14. In a motion reproducing device, a motion-receiving member and a driven member, a variable speed driving means for the driven member including a speed adjusting element, and controlling means for the variable speed driving means comprising differential means connected to compare the motion of the two members, means for integrating the output of the differential means, means for combining the output of the differential means with the output of the said integrating means, means for integrating the output of the said combining means, means for combining the output of the said combining means with the output of the last mentioned integrating means, and means for applying the output of the last mentioned combining means to the speed adjusting element.

15. In a motion reproducing device, a motion-receiving member and a driven member, a variable speed driving means for the driven member including a speed adjusting element, and controlling means for the variable speed driving means comprising differential means connected to compare the motion of the two members, means for integrating the output of the differential means, means for combining the output of the differential means with the output of the said integrating means, means for integrating the output of the said combining means, means for combining the output of the differential means with the output of the last mentioned integrating means, and means for applying the output of the last mentioned combining means to the speed adjusting element.

References Cited in the file of this patent

UNITED STATES PATENTS

| | | |
|---|---|---|
| 1,481,645 | Kaminski | Jan. 22, 1924 |
| 1,986,640 | Lamond | Jan. 1, 1935 |